Jan. 18, 1949.  J L SMITH  2,459,549
FISHING ROD HOLDER
Filed Dec. 29, 1945

Inventor
J L Smith

By Clarence A O'Brien
and Harvey B. Jacobson
Attorneys

Patented Jan. 18, 1949

2,459,549

UNITED STATES PATENT OFFICE 2,459,549

FISHING ROD HOLDER

J L Smith, Birmingham, Ala.

Application December 29, 1945, Serial No. 637,944

1 Claim. (Cl. 248—42)

This invention relates to novel and useful improvements and structural refinements in fishing rod holders and the principal object of the invention is to provide a device of the character herein described, by means of which the fishing rod may be firmly and securely supported from the ground so that a plurality of rods may be employed by the same fisherman at the same time.

A further object of the invention is to provide a holder from which the rod can be easily and conveniently released and which does not in any way, interfere with the conventional fishing practice.

Another object of the invention is to provide a holder which does not interfere with the operation of the reel associated with the fishing rod.

An additional object of the invention is to provide a holder which is simple in construction and which cannot easily become damaged.

With the above more important objects in view, and such other objects as may become apparent as this specification proceeds, the invention consists essentially of the arrangement and construction of parts as illustrated in the accompanying drawings, in which.

Like characters of reference are used to designate like parts in the specification and throughout the several views.

Figure 1:
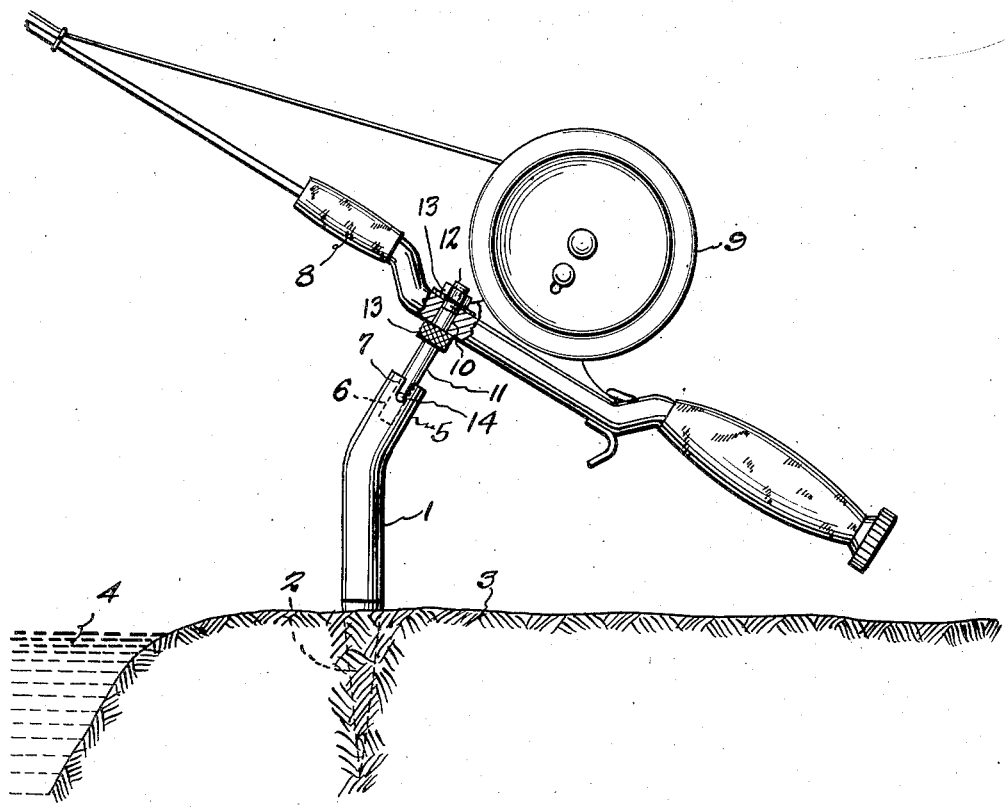
Figure 1 is a side elevation of the invention, showing the same partially broken away to reveal its construction.

Referring to the accompanying drawings in detail, the invention consists of a cylindrical standard 1, provided at the lower end thereof with a pointed portion 2 whereby it may be pressed vertically into the ground 3 adjacent to a body of water 4.

The upper end of the standard 1 is provided with an angulated portion 5 which, in turn, has a blind, axial bore 6 formed in the end thereof. The circumferential wall of the bore 6 is provided with a pair of diametrically opposed, open-ended slots 7, the purpose of which will be hereinafter more fully described.

A conventional fishing rod 8, associated, if desired, with the reel 9 is provided with an aperture 10 extending through the reel mounting as will be clearly apparent from the accompanying Figure 1.

Figure 3:
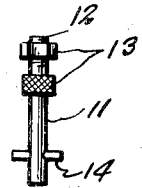
Figure 3 is a side elevation showing the adapter with the lock nuts positioned thereon.
Figure 2:
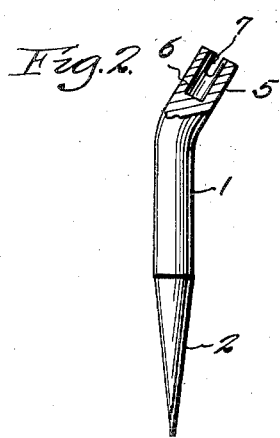
Figure 2 is a side elevation of the standard used in the holder, the same also being partially broken away.

A cylindrical adapter bar 11 is provided at one end thereof with a screw-threaded portion 12, which passes through the aforementioned aperture 10 and is secured therein by means of a pair of lock nuts 13. The remaining end of the bar 11 carries a transversely extending pin 14 which projects through the sides of the bar as is best illustrated in the accompanying Figure 3.

The end of the bar 11 is insertable into the aforementioned bore 6, with the projecting ends of the pin 14 engaging the slots 7.

When the invention is placed in operation, the end 2 of the standard 1 is pressed into the ground as shown in the accompanying drawings, whereupon the rod and reel may be readily supported thereby by inserting the adapter bar 11 into the bore 6. It will be noted that the angulation of the standard portion 5 is such as to support the rod at the desired angle above the water 4, and the rod may be easily and conveniently removed from its holder by simply withdrawing the adapter bar 11 from the bore 6.

The engagement of the pin 14 with the slot 7 will prevent undesirable rotation of the rod about the standard 1, such as would normally be caused by excessive water currents or strong winds.

While in the foregoing there has been shown and described the preferred embodiment of this invention it is to be understood that minor changes in the details of construction, combination, and arrangement of parts may be resorted to without departing from the spirit and scope of the invention as claimed.

What I claim as my invention is:

In association with a fishing rod formed with a transversely extending aperture adjacent the handle thereof, a holder comprising a cylindrical standard terminating at one end in a pointed extremity adapted for insertion in the ground, the remaining end portion of said standard being formed with a blind, axial bore and with a pair of diametrically opposed, open-ended slots in the wall of said bore, an adapter bar having one end portion thereof removably secured in the aperture of said rod, and a transversely extending pin secured adjacent the remaining end of said bar, the pin-equipped end portion of said bar being removably receivable in said bore and said slots receiving the end portions of said pin.

J L SMITH.

REFERENCES CITED

The following references are of record in the file of this patent:

UNITED STATES PATENTS

| Number | Name | Date |
| --- | --- | --- |
| 1,760,592 | Gift | May 27, 1930 |
| 2,289,592 | Riedi | July 14, 1942 |
| 2,311,823 | Gaskill | Feb. 23, 1943 |

FOREIGN PATENTS

| Number | Country | Date |
| --- | --- | --- |
| 192,787 | Great Britain | Feb. 15, 1923 |